United States Patent [19]

Cavalla et al.

[11] 3,917,614

[45] Nov. 4, 1975

[54] 1-(PYRROLYLALKYL)PIPERIDINES

[75] Inventors: John Frederick Cavalla, Isleworth; John Leheup Archibald, Windsor, both of England

[73] Assignee: John Wyeth & Brother Limited, Maidenhead, England

[22] Filed: Nov. 15, 1974

[21] Appl. No.: 524,161

Related U.S. Application Data

[63] Continuation-in-part of Ser. No. 323,684, Jan. 15, 1973, which is a continuation-in-part of Ser. No. 175,345, Aug. 26, 1971, abandoned.

[30] Foreign Application Priority Data

Sept. 3, 1970 United Kingdom............... 42090/70

[52] U.S. Cl..................260/293.71; 260/293.77; 260/295 AM; 260/295 Q; 260/313.1; 260/326.5 R; 260/326.9; 424/267
[51] Int. Cl.² ...................................... C07D 211/58
[58] Field of Search............................. 260/293.71

[56] References Cited
UNITED STATES PATENTS

| | | | |
|---|---|---|---|
| 3,539,589 | 11/1970 | Teotino et al. ................ | 260/293.71 |
| 3,706,750 | 12/1972 | Teotino et al. ................ | 260/293.71 |

OTHER PUBLICATIONS

Chemical Abstracts, 77:34,355z. (1972), Archibald et al.

Chemical Abstracts, 79:136,989t, (1973), Archibald.

*Primary Examiner*—Sherman D. Winters

[57] ABSTRACT

A group of pyrrole compounds useful in the treatment of disorders and diseases of the cardiovascular system is described. These compounds and intermediates for their preparation are piperidine compounds linked by the nitrogen atom to a substituted or unsubstituted pyrrole radical through the intermediary of a group selected from a lower-alkylene radical, a mono- or di-keto lower-alkylene radical or a hydroxy-lower-alkylene radical. The piperidine rings are further substituted by an amino or acylamino residue.

3 Claims, No Drawings

1-(PYRROLYLALKYL)PIPERIDINES

This invention relates to novel pyrrole compounds and is a continuation in part of our copending application Ser. No. 323,684 filed Jan. 15, 1973 and entitled "Heterocyclic Compounds" which in turn is a continuation-in-part of our U.S. Application Ser. No. 175,345 filed Aug. 26, 1971 and entitled "Pharmaceutical Compositions," and now abandoned.

The invention provides a heterocyclic compound of the general formula

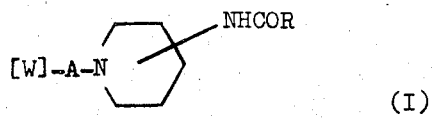

(I)

and the pharmaceutically acceptable acid addition salts thereof wherein W represents a pyrrolyl radical, which may be substituted by lower alkyl and/or phenyl, A represents a lower alkylene radical of from 1 to 4 carbon atoms or a mono or diketo lower alkylene radical or a hydroxy-lower-alkylene radical of from 2 to 4 carbon atoms and R represents phenyl.

It is to be understood that the term "alkylene" used herein includes both straight and branched chain radicals.

The compounds of formula (I) except those in which A is a diketo lower alkylene radical, and the pharmaceutically acceptable acid addition salts thereof exhibit pharmacological activity for example action on the cardiovascular system (such as hypotensive and/or antihypertensive activity).

In addition to having useful pharmaceutical properties as mentioned above the novel compounds of the invention are intermediates for the preparation of other compounds of formula I. The other compounds of the invention are also intermediates for the preparation of pharmacologically active compounds.

Examples of W are pyrrolyl (for example 2— and 3— pyrrolyl), which pyrrole radical may be unsubstituted or substituted by lower alkyl (for example methyl, ethyl, propyl, or n, s and t-butyl), or phenyl.

Examples of A are methylene, ethylene, propylene, methylethylene, butylene, oxoethylene, oxalyl, oxobutylene, hydroxyethylene and hydroxybutylene. Examples of acid addition salts are those formed from inorganic and organic acids in particular pharmaceutically acceptable acid addition salts such as the sulphate, hydrochloride, hydrobromide, hydro-iodide, nitrate, phosphate, sulphonate (such as the methane-sulphonate and p-toluene-sulphonate), acetate, maleate, fumarate, tartrate and formate.

The compounds of general formula (I) can be prepared in a number of ways by building up the molecule from suitable starting materials in known manner. Such processes applied to the preparation of the novel compounds of formula (I) are included in the scope of the invention.

One method of preparation of compounds of general formula (I) comprises reacting a compound of the general formula

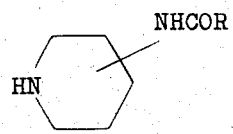

III with an alkylating or acylating agent of the general formula

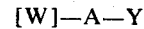

IV where R, W and A have the meanings already defined and Y is a halogen atom or an equivalent replaceable atom or radical, for example an organic sulphonyl radical such as tosyl radical. As an alternative, the compound of formula III may be reacted with a vinyl substituted compound of formula

wherein B is a straight or branched chain alkenyl radical, preferably a vinyl radical to give a corresponding compound of formula (I) wherein A is a straight or branched chain alkylene radical.

The compounds of general formulae (IV), and (VII) are known compounds or can be made following the methods known for preparing compounds of these types. The starting materials of general formula III can generally be made by acylating a corresponding amino compound of the general formula

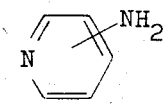

VIII and reducing the ring system to the corresponding piperidine ring. The starting material of general formula III is preferably prepared by either (i) forming the oxime of an N-benzyl-4-piperidone, reducing to give the 4-amino compound, acylating the amino group and then hydrogenolysing the benzyl residue, or (ii) treating the pyridine of formula

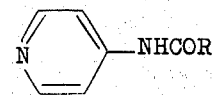

IX with a benzyl halide, for example benzyl chloride to give the quaternary salt, reducing with an alkali metal borohydride to give the corresponding N-benzyl-tetrahydro-pyridine which is further subjected to concomitant de-benzylation and reduction of the 3,4-double bond by catalytic hydrogenation, or (iii) catalytic hydrogenation of compound (IX) in the presence of acetic anhydride to give

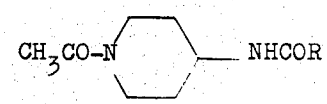

X and then selectively hydrolysing the acetyl group.

A second general method of preparation of compounds of formula (I) comprises reacting a compound corresponding to formula (I) but containing a free amino group in the piperidine ring instead of the group NHCOR, with either a reactive derivative of an acid of general formula R·COOH (where R is as defined above). As a reactive derivative of the acid of formula R·COOH used in the process described above, we have found it preferable usually to use a halide (for example the chloride or bromide) or an anhydride. Other examples of reactive derivatives of the acid R·COOH which may be used are the acid azide, mixed anhydrides and active esters. Furthermore, the compounds of formula (I) may also be prepared by treating a compound corresponding to formula (I) but containing a free amino group in the piperidine ring instead of the group NHCOR, with the acid R·COOH in the presence of a known condensing agent (for example, a carbodiimide), or by first activating the amino function (for example, by forming the phosphazo derivative) and then reacting with the acid R·COOH. In connection with above reactions with the free amino group reference may be made to "Chemistry of the Amino Acids" by Greenstein and Winitz (John Wiley and Sons, Inc., Publishers, 1961) at pages 782-883 and 943-1108.

When the compounds of general formula (I) are desired in which A is a lower alkylene or a mono— or di- keto lower alkylene radical the preparation may comprise a Mannich reaction using formaldehyde, a compound of formula III as secondary amine and either a compound WH, where W has the meanings already defined and thus WH can be considered as a compound formed by addition of a hydrogen atom to said radical W; said compound WH also containing a suitable reactive site of the type known in the literature to participate in the Mannich reaction, or a derivative of W (as just defined) in which the chain A has already been partially formed, and which partially formed chain contains a site of the type known in the literature to participate in the Mannich reaction. Examples of the latter type of derivative are [W]—CH₃ and [W]—CO.CH₃ which derivatives are known compounds or can be made following the methods known for preparing compounds of these types. The formaldehyde used in the above reaction may be in the form of a solution in an inert solvent or as paraformaldehyde.

A still further aspect of the invention is the provision of a further process for the preparation of compounds of general formula (I) in which W and R have the meanings defined in connection with formula (I) and A is a lower alkylene radical and wherein the process consists of reacting a compound of the general formula

[W]—A—OH

XVI (in which W, and A have the meanings defined immediately above) with a compound of formula III.

The reaction is preferably carried out in the presence of a catalyst, for example Raney Nickel. An organic solvent, which is inert under the reaction conditions, is usually for example xylene, toluene or benzene. Preferably the reaction is carried out by heating the reactants under reflux in a water-immiscible organic solvent, for example xylene, and removing the water formed during the reaction by azeotropic distillation. If necessary, re- active substituent groups can be blocked during a reaction and released later.

In order to prepare a compound of formula (I) in which W and R have the meanings defined in connection with formula (I), and A is a mono-keto lower-alkylene radical of formula —CO.(CH₂)ₘ— in which m is 1 to 5, a compound of formula

[W]—H

XVII can be acylated (Friedel-Crafts) with an acid halide of formula

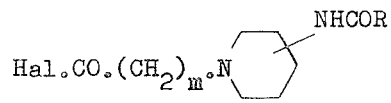

XVIII

For details of the reaction, reference may be made to "The Friedel-Crafts and related Reactions," by G.A. Olah, Vol. 2 (Interscience Publishers, 1964).

The reactions outlined above usually are carried out in a solvent which is inert under the reaction conditions. The most suitable solvent system is chosen and varies depending on the particular reactants conditions. If necessary heating the reactants in solution under reflux can be carried out, and if necessary heating under high pressures may also be used.

If a compound of formula (I) is prepared in which the chain A contains one or more carbonyl functions, then this chain may be selectively reduced. For example when A is the oxalyl residue —CO.CO—, this may be reduced under mild conditions such as by a hydride transfer agent (particularly lithium aluminium hydride) to give the

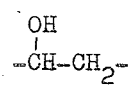

residue. When A is the —CO—CH₂— residue this may be reduced with an alkali metal borohydride to give the

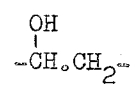

residue. When the oxalyl residue is reduced under more drastic conditions, the ethylene chain —CH₂—CH₂— results.

If a compound of formula (I) is produced, if necessary this may be hydrolysed to the corresponding compound containing a free amino group instead of the group NHCOR and which may then be reacted to give a compound of formula (I) with a different —COR group.

Compounds of formula I in which A contains a hydroxy group i.e. hydroxy-lower-alkylene or wherein A is a branched chain alkylene radical possess an asymmetric carbon atom and are therefore capable of existing in optically active stereo isomeric forms. The optical isomers may be separated by standard resolution procedures. For instance compounds may generally be resolved by treatment with a suitable optically active acid. Optically active acids are described in the literature and suitable ones for the resolution of any particular compound are chosen by experiment. If necessary, in any of the reactions hereinbefore described, reactive substituent groups may be blocked during a reaction and released at a later stage. As already indicated the novel piperidine compounds provided by the invention contain a basic nitrogen atom and thus can form acid addition salts with acids (particularly pharmaceutically acceptable acids) or quaternary ammonium salts, for example with alkyl halides or aralkyl halides (particularly methyl iodide or benzyl chloride or bromide). The acid addition salts may either be formed in situ during the hereinbefore described processes and isolated therefrom or a free base may be treated with the appropriate acid in the presence of a suitable solvent and then the salt isolated. The quaternary salts may be prepared by treating the free base with the appropriate halide in the presence or absence of a solvent.

The active compounds of the invention may be formulated into pharmaceutical compositions which contain a compound of formula (I) as hereinbefore defined, which may be micronised. In addition to the active ingredient, said compositions also contain a nontoxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included. Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

The following non-limiting Examples illustrate the invention:

EXAMPLE 1

1-(Pyrrol-2-yl)oxalyl-4-benzamidopiperidine

A solution of redistilled pyrrole (13.4 g.) in ether (50 ml.) was added to a stirred solution of oxalyl chloride (20 ml.) in ether (250 ml.) at −50°C. Stirring and cooling were maintained for 1 hour, then the solution was poured into a vigorously stirred mixture of sodium bicarbonate (100 g.) in water (600 ml.) and 4-benzamidopiperidine (80 g.) in chloroform (400 ml.). The reaction mixture was kept at 0°C for 40 hours, then the solid was filtered off and recrystallised from ethanol-water to give the product hydrate (80 g.), m.p. 124°–5°C. (Found: C, 63.0; H, 6.2; N, 12.2. $C_{18}H_{19}N_3O_3 \cdot H_2O$ requires: C, 63.0; H, 6.2; N, 12.2%).

The product was useful as an intermediate for the next example.

EXAMPLE 2

1-[2-Hydroxy-2-(2-pyrrol-2-yl)ethyl]-4-benzamidopiperidine

The product of Example 1 (3.4 g.) in tetrahydrofuran (80 ml.) was added to a stirred suspension of lithium aluminium hydride (1.9 g.) in tetrahydrofuran (100 ml.) When the addition was complete the suspension was heated under reflux for 3 hours. Water (5.5 ml.) was added dropwise and the inorganic material was filtered off. Evaporation of the filtrate and recrystallisation of the residue from ethanol gave the product (2.5 g.) m.p. 138°–139°C. (Found: C, 69.1; H, 7.7; N, 13.2. $C_{18}H_{23}N_3O_2$ requires C, 69.0; H, 7.4; N, 13.4%).

The product exhibited hypotensive activity.

EXAMPLE 3

1-(2,5-Dimethyl-1-phenylpyrrol-3-yl-methyl)-4-benzamidopiperidine

A solution of 4-benzamidopiperidine (23.9 g.) in dioxan (200 ml.), acetic acid (200 ml.) and 40% aqueous formaldehyde (100 ml.) was cooled to 5° and a solution of 2,5-dimethyl-1-phenylpyrrole (20.0 g.) in dioxan (200 ml.) was added slowly with stirring. The mixture was stirred for 1 hr. at room temperature then 1 hr. at 70°. It was then extracted with diethylether. The aqueous layer was basified with 10N NaOH solution and extracted with chloroform. Evaporation of the washed and dried extracts gave a brown tar which partly solidified on standing 3 days. Trituration with diethylether and crystallisation from methanol-water gave the product as a hydrate (7.37 g.) m.p. 191°. (Found: C, 73.87; H, 7.53; N, 10.58. $C_{25}H_{29}N_3O$ requires C, 74.04; H, 7.71; The product exhibited hypotensive activity. Tests for action on the cardiovascular system were conducted according to one of the following procedures:

Hypotensive and/or Anti-Hypertensive activity

Method 1 (Rat)

Rats were anaesthetised with pentobarbitone sodium (60 mg/kg) and the jugular vein, trachea and carotid artery were cannulated. The test compound was given intravenously at 15 min. intervals (dose range 0.8–25.6 mg/kg cumulative) and blood pressure and heart rate were recorded via the carotid artery at 30 second and 15 minutes after administration. The production of a fall of 30 mm. mercury in diastolic pressure from control values was considered to be significant hypotensive activity. A decrease in heart rate of more than 30% from control values was considered to be significant bradycardia.

Method 1 (Cat)

Cats were anaesthetised with pentobarbitone sodium (30 mg/kg) and the cephalic vein, femoral and carotid arteries and trachea were cannulated. The carotid cannula was introduced into the left ventricle and the femoral cannula into the aorta. Blood pressure and heart rate were recorded from the aortic cannula and left ventricular pressure from the carotid cannula. The test compounds were administered intravenously 0.1–25.6 mg/kg).

Method 2 (hypertensive rats)

Male or female rats are rendered hypertensive by applying a figure of 8 ligature around one kidney and contralateral nephrectomy. Blood pressure stabilises at a hypertensive level after 6 weeks. Systolic pressure is measured indirectly using a Decker Caudal Plethysmograph. A control group of rats is run with each group treated with drug. Each group usually consists of six rats. Drugs are usually administered by the IP or oral routes. Pressures are read prior to drug administration and at two and 24 hours thereafter.

Activity in either method 1 (rats or cats) or method 2 was considered to indicate hypotensive activity.

We claim:
1. A heterocyclic compound of the formula

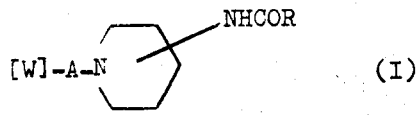

or a pharmaceutically acceptable acid addition salt thereof wherein W represents pyrrolyl or pyrrolyl substituted by lower alkyl and/or phenyl, A represents a lower alkylene radical of from 1 to 4 carbon atoms or a mono or diketo lower alkylene radical or a hydroxy-lower-alkylene radical of from 2 to 4 carbon atoms and R represents phenyl.

2. A compound as claimed in claim 1 which is 1-[2-hydroxy-2-(2-pyrrol-2-yl)ethyl]-4-benzamidopiperidine.

3. A compound as claimed in claim 1 which is 1-(2,5-dimethyl-1-phenylpyrrol-3-yl-methyl)-4-benzamidopiperidine.

* * * * *